(12) United States Patent
Priewasser et al.

(10) Patent No.: US 11,559,974 B2
(45) Date of Patent: Jan. 24, 2023

(54) MICROFLUIDIC SYSTEM OR DEVICE AND METHOD OF MANUFACTURING A MICROFLUIDIC SYSTEM OR DEVICE

(71) Applicant: DISCO Corporation, Tokyo (JP)

(72) Inventors: Karl Heinz Priewasser, Munich (DE); Devin Martin, Santa Clara, CA (US)

(73) Assignee: DISCO CORPORATION, Tokyo (JP)

( * ) Notice: Subject to any disclaimer, the term of this patent is extended or adjusted under 35 U.S.C. 154(b) by 559 days.

(21) Appl. No.: 16/130,487

(22) Filed: Sep. 13, 2018

(65) Prior Publication Data
US 2019/0091649 A1 Mar. 28, 2019

(30) Foreign Application Priority Data
Sep. 27, 2017 (DE) .................. 10 2017 217 179.0

(51) Int. Cl.
*B32B 27/30* (2006.01)
*B01J 19/00* (2006.01)
(Continued)

(52) U.S. Cl.
CPC ......... *B32B 27/304* (2013.01); *B01J 19/0093* (2013.01); *B01L 3/502707* (2013.01); *B32B 3/28* (2013.01); *B32B 15/18* (2013.01); *B32B 27/306* (2013.01); *B32B 27/32* (2013.01); *B01J 2219/0086* (2013.01); *B01J 2219/00783* (2013.01); *B01J 2219/00813* (2013.01); *B01J 2219/00822* (2013.01); *B01J 2219/00831* (2013.01); *B01J 2219/00833* (2013.01);
(Continued)

(58) Field of Classification Search
None
See application file for complete search history.

(56) References Cited

U.S. PATENT DOCUMENTS 6,645,432 B1 * 11/2003 Anderson ............. B01L 3/0262
137/833
2003/0012697 A1 * 1/2003 Hahn ...................... B01L 9/527
422/400
(Continued)

FOREIGN PATENT DOCUMENTS

JP 2004288845 A 10/2004
JP 2009523635 A 6/2009
(Continued)

*Primary Examiner* — Lore R Jarrett
(74) *Attorney, Agent, or Firm* — Greer Burns & Crain Ltd.

(57) ABSTRACT

A method of manufacturing a microfluidic system or microfluidic device having at least one channel includes providing a base sheet, providing a deformable intermediate layer, providing a cover film, and laminating the base sheet, the intermediate layer and the cover film so that a back surface of the intermediate layer is attached to a front surface of the base sheet and a back surface of the cover film is attached to a front surface of the intermediate layer opposite to the back surface thereof, thereby forming a laminate comprising the base sheet, the intermediate layer and the cover film. Further, the method includes applying pressure to the front surface of the intermediate layer through the cover film so as to deform the intermediate layer, thereby forming the at least one channel. The invention also relates to a microfluidic system or microfluidic device) manufactured by this method.

16 Claims, 4 Drawing Sheets

(51) Int. Cl.
*B01L 3/00* (2006.01)
*B32B 3/28* (2006.01)
*B32B 15/18* (2006.01)
*B32B 27/32* (2006.01)

(52) U.S. Cl.
CPC .. *B01J 2219/00936* (2013.01); *B01L 2200/12* (2013.01); *B01L 2300/0803* (2013.01); *B01L 2300/0816* (2013.01); *B01L 2300/0883* (2013.01); *B01L 2300/0887* (2013.01); *B32B 2307/732* (2013.01)

(56) References Cited

U.S. PATENT DOCUMENTS

| | | | |
|---|---|---|---|
| 2007/0056680 A1* | 3/2007 | Tan | B81C 1/0046 156/232 |
| 2007/0110962 A1 | 5/2007 | Tien et al. | |
| 2010/0001434 A1* | 1/2010 | Atkin | B32B 39/00 264/293 |
| 2010/0068489 A1 | 3/2010 | Kobrin et al. | |

FOREIGN PATENT DOCUMENTS

| | | |
|---|---|---|
| JP | 2017030357 A | 2/2017 |
| JP | 2017504183 A | 2/2017 |
| WO | 2004107403 A2 | 12/2004 |

* cited by examiner

MICROFLUIDIC SYSTEM OR DEVICE AND METHOD OF MANUFACTURING A MICROFLUIDIC SYSTEM OR DEVICE

TECHNICAL FIELD

The present invention relates to a method of manufacturing a microfluidic system or microfluidic device having at least one channel. Further, the present invention relates to a microfluidic system or microfluidic device having at least one channel.

TECHNICAL BACKGROUND

Microfluidic systems and devices are commonly employed in various technical fields, such as medical applications, biotechnology, chemical engineering, environment analysis, food quality analysis, measurement equipment, the analysis field, and flexible electronics manufacturing. In particular, microfluidic systems and devices, such as Micro Total Analysis Systems (µ-TAS) and Labs-on-a-chip (LOC), are used for micro reactors and micro analysis systems.

Such systems and devices offer the advantage that, utilising their micro scale space, the required quantity of test materials and the resulting amount of waste disposals can be significantly reduced. The systems and devices are easy to store and transport, and no large size testing facilities are necessary. Further, reactions taking place on the micro scale of such systems and devices, allowing for the use of a small quantity of specimen, are usually very fast, thus considerably reducing the required testing time.

Commonly, such microfluidic systems and devices are made of glass, such as borosilicate glass or quartz glass, of polydimethylsiloxane (PDMS) resin, or of plastic. These materials are usually processed, in particular, provided with one or more microfluidic channels, by using photo lithography, sand blasting, laser grooving, laser drilling; wet etching, hot stamping or the like.

However, such known manufacturing methods of microfluidic systems and devices generally require substantive expenses. For one thing, the materials to be used, such as glass, are often expensive and difficult to process. For another thing, methods such as photo lithography, laser grooving and laser drilling necessitate the use of complicated and high-cost processing equipment. Moreover, many of the known manufacturing methods are unflexible, i.e., difficult to adapt to different system and device designs, thus further increasing the manufacturing costs.

If imprinting methods, such as hot stamping, are used for forming one or more microfluidic channels in a substrate to be processed, problems often arise with regard to deformation of the channels and/or substrate material residues on the imprinting equipment. These issues severely restrict the accuracy of the channel dimensions achievable by such methods, making them unfeasible for applications which require well-defined channels.

Hence, there remains a need for a cost efficient and reliable method of manufacturing a microfluidic system or microfluidic device which allows for one or more channels to be formed with a high degree of accuracy.

SUMMARY OF THE INVENTION

Accordingly, it is an object of the present invention to provide a cost efficient and reliable method of manufacturing a microfluidic system or microfluidic device which allows for one or more channels to be formed with a high degree of accuracy. Further, the invention aims to provide a microfluidic system or microfluidic device manufactured by such a method. These goals are achieved by a manufacturing method with the technical features of claim 1 and a microfluidic system or microfluidic device with the technical features of claim 18. Preferred embodiments of the invention follow from the dependent claims.

The invention provides a method of manufacturing a microfluidic system or microfluidic device having at least one channel. The method comprises providing a base sheet, providing a deformable intermediate layer, providing a cover film, and laminating the base sheet, the intermediate layer and the cover film so that a back surface of the intermediate layer is attached to a front surface of the base sheet and a back surface of the cover film is attached to a front surface of the intermediate layer opposite to the back surface thereof, thereby forming a laminate comprising the base sheet, the intermediate layer and the cover film. Further, the method comprises applying pressure to the front surface of the intermediate layer through the cover film so as to deform the intermediate layer, thereby forming the at least one channel.

The at least one channel is configured to receive test materials and specimens to be treated and/or analysed. The at least one channel may be configured to transport test materials and specimens to be treated and/or analysed. The at least one channel is a microfluidic channel. The at least one channel may have a length which is larger than a width of the at least one channel. In particular, the length of the at least one channel may be at least twice as large as the width of the at least one channel, preferably at least three times as large as the width of the at least one channel, and more preferably at least four times as large as the width of the at least one channel.

The microfluidic system or microfluidic device manufactured by the method of the invention comprises the laminate comprising the base sheet, the intermediate layer and the cover film, wherein the at least one channel is present in the laminate so as to be open to the side of the cover film.

In the method of the invention, the at least one channel is formed by applying pressure to the front surface of the intermediate layer through the cover film so as to deform the intermediate layer. The pressure thus is not applied directly to the front surface of the deformable intermediate layer. Rather, the pressure is applied indirectly to the front surface of the deformable intermediate layer, i.e., via the cover film. The cover film is arranged between a pressure application means for applying pressure to the intermediate layer front surface, such as, for example, a stamp, a mold or a die, and the intermediate layer. Hence, in the process of deforming the intermediate layer, the pressure application means does not come into direct contact with the intermediate layer. In this way, it is ensured that the material of the deformable intermediate layer does not adhere or stick to the pressure application means, thereby reliably avoiding the occurrence of residues of deformable intermediate layer material on the pressure application means and deformation of the at least one channel. Therefore, the at least one channel can be formed with a high degree of accuracy, e.g., with micrometer precision. Also, undesired fluctuations in the dimensions of the at least one channel are prevented, thus achieving a reliable manufacturing method.

Further, no expensive and difficult to process materials, such as glass, e.g., borosilicate glass or quartz glass, and no complicated high-cost processing equipment, as is required for methods such as photo lithography, laser grooving and laser drilling, are needed. Rather, the at least one channel is formed by applying pressure to the front surface of the intermediate layer, allowing for the use of simple pressure application means, such as stamps, molds or dies. Since no residues of deformable intermediate layer material on the pressure application means occur, the service life thereof can be significantly extended and the maintenance and repair costs are minimised. Thus, a cost efficient manufacturing method is provided.

Moreover, the method of the invention can be easily adapted to different system and device designs by suitably modifying the pressure application means.

Hence, the present invention provides a cost efficient and reliable method of manufacturing a microfluidic system or microfluidic device which allows for one or more channels to be formed with a high degree of accuracy.

The cover film may be expandable. In particular, the cover film may be expandable to twice its original size or more, preferably three times its original size or more, and more preferably four times its original size or more.

The method may further comprise expanding the cover film.

The cover film may be expanded when the pressure is applied to the front surface of the intermediate layer through the cover film.

By using an expandable cover film, in particular, a cover film which is expandable to three or four times its original size or more, the at least one channel can be formed with a particularly high degree of accuracy. For example, in this, way, it can be especially reliably ensured that the cover film closely follows the contours of a pressure application means, such as, for example, a stamp, a mold or a die, so that the at least one channel is formed with particularly high precision.

The intermediate layer may be curable by an external stimulus, such as UV radiation, heat, an electric field and/or a chemical agent. In this case, the intermediate layer hardens, at least to some degree, upon application of the external stimulus thereto. The intermediate layer may be configured so as to reach a rigid, hard state after curing. For example, the intermediate layer may be formed of a curable resin, a curable adhesive, a curable gel or the like. Using such a material for the intermediate layer allows for the at least one channel to be formed in a particularly simple and efficient manner.

Preferred examples of UV curable resins for use as the intermediate layer in the manufacturing method of the invention are ResiFlat by the DISCO Corporation and TEMPLOC by DENKA.

The method may further comprise applying the external stimulus to the intermediate layer so as to cure the intermediate layer, after forming the at least one channel. In this way, it can be particularly reliably ensured that the dimensions of the at least one channel are maintained throughout the service life of the microfluidic system or device. Thus, an especially robust and stable microfluidic system or device is provided.

In the method of the invention, the base sheet, the intermediate layer and the cover film may be laminated first, thereby forming the laminate comprising the base sheet, the intermediate layer and the cover film. Subsequently, after forming the laminate, pressure may be applied to the front surface of the intermediate layer through the cover film so as to deform the intermediate layer, thereby forming the at least one channel. Thus, the at least one channel is formed in the laminate.

In this way, the manufacturing method can be carried out in a particularly simple and efficient manner. For example, the laminate, comprising the base sheet, the intermediate layer and the cover film, can be prepared in advance, stored for later use and used for microfluidic system or device manufacture when required. The laminate may thus be manufactured in large quantities, rendering the production thereof particularly efficient in terms of both time and cost.

Alternatively, pressure may be applied to the front surface of the intermediate layer through the cover film so as to deform the intermediate layer, thereby forming the at least one channel, during forming the laminate comprising the base sheet, the intermediate layer and the cover film.

For example, pressure may be applied to the front surface of the intermediate layer using a pressure application means having a base, e.g., a base substrate, and one or more projections protruding from the base, e.g., protruding from a plane surface of the base. In this case, the at least one channel is formed by pressing the one or more projections into the intermediate layer so as to deform the intermediate layer. Prior to pressing the one or more projections into the intermediate layer, the cover film may be applied or attached to a side or surface of the base from which the one or more projections protrude, e.g., a front side of the base. In particular, the cover film may be applied or attached to this side or surface of the base so as to follow the contours of the projections.

It is particularly preferable that the cover film is compressible, elastic, flexible and/or pliable. In this way, it can be particularly reliably ensured that the cover film conforms to the contours of the projections.

Subsequently, the side or surface of the base having the cover film applied or attached thereto may be pressed against the intermediate layer, thereby deforming the intermediate layer through the cover film, so as to form the at least one channel, and, at the same time, forming the laminate.

In this case, the cover film can be applied or attached to the side or surface of the base from which the one or more projections protrude with a particularly high degree of accuracy, thus further enhancing the precision with which the at least one channel is formed.

For example, the step of applying or attaching the cover film to the pressure application means may be carried out in a vacuum chamber. In particular, the cover film may be applied or attached to the pressure application means by using a vacuum laminator. In such a vacuum laminator, the pressure application means is placed, e.g., on a chuck table in a vacuum chamber in a state in which a back side of the base is in contact with an upper surface of the chuck table and a front side of the base, from which the one or more projections protrude, is oriented upward. The cover film to be attached to the base front side may be held at its peripheral portion by a frame, such as an annular frame, and placed above the base front side in the vacuum chamber. An upper part of the vacuum chamber which is situated above the chuck table and the frame is provided with an air inlet port closed by an expandable rubber membrane.

After the pressure application means and the cover film have been loaded into the vacuum chamber, the chamber is evacuated and air is supplied through the air inlet port to the rubber membrane, causing the rubber membrane to expand into the evacuated chamber. In this way, the rubber membrane is moved downward in the vacuum chamber so as to push the cover film against the base front side. Hence, the cover film can be attached closely to the base front side, so as to follow the contours of the projections. Alternatively, the rubber membrane can be replaced by a soft stamp or a soft roller.

Subsequently, the vacuum in the vacuum chamber is released and the cover film is held in its position on the base front side by the positive pressure in the vacuum chamber.

The method may comprise heating the cover film during and/or after applying the cover film to the front side of the base. The cover film can be softened by the heating process, thus particularly reliably ensuring that the film conforms to the topography of the base front side.

The heating process may serve to attach the cover film to the front side of the base. In particular, an attachment force between cover film and base may be generated through the heating process. The attachment of the cover film to the base may be caused in the heating process itself and/or in a subsequent process of allowing the cover film to cool down. For example, the cover film may be softened by the heating process. Upon cooling down, e.g., to its initial temperature, the cover film may reharden, e.g., so as to create a form fit and/or a material bond to the base.

The cover film may be heat resistant up to a temperature of 180° C. or more, preferably up to a temperature of 220° C. or more, and more preferably up to a temperature of 250° C. or more.

The cover film may be heated to a temperature in the range of 60° C. to 150° C., preferably 70° C. to 140° C., more preferably 80° C. to 130° C. and even more preferably 90° C. to 120° C. Particularly preferably, the cover film is heated to a temperature of approximately 100° C.

The cover film may be heated over a duration in the range of 30 sec to 10 min, preferably 1 min to 8 min, more preferably 1 min to 6 min, even more preferably 1 min to 4 min and yet more preferably 1 min to 3 min, during and/or after applying the cover film to the base.

The cover film may be directly and/or indirectly heated.

The cover film may be heated by directly applying heat thereto, e.g., using a heat application means, such as a heated roller, a heated stamp or the like, or a heat radiation means. The cover film and the pressure application means may be placed in a receptacle or chamber, such as a vacuum chamber, and an inner volume of the receptacle or chamber may be heated, so as to heat the cover film. The receptacle or chamber may be provided with a heat radiation means.

The cover film may be indirectly heated, e.g., by heating the pressure application means before and/or during and/or after applying the cover film to the base. For example, the pressure application means may be heated by placing it on a support or carrier, such as a chuck table, and heating the support or carrier.

In addition or as an alternative, the cover film may be attached to the front side of the base by an adhesive, e.g., an adhesive layer.

The adhesive layer may have a thickness in the range of 5 to 200 µm, preferably 10 to 150 µm and even more preferably 20 to 100 µm.

The adhesive may be provided only in a peripheral area of the side or surface of the base from which the one or more projections protrude, e.g., the front side of the base. In this way, it can be particularly reliably ensured that no adhesive residues remain in the base region where the projections are formed after removal of the pressure applications means from the laminate. Also, any adhesive residues in the at least one channel are avoided.

Further, by providing the adhesive only in the peripheral area, the area in which cover film and pressure applications means are attached to each other is significantly reduced. Thus, the pressure applications means can be removed from the laminate more easily after forming the at least one channel.

The adhesive may be curable by an external stimulus, such as heat, UV radiation, an electric field and/or a chemical agent. In this way, the pressure applications means can be particularly easily removed from the laminate after forming the at least one channel. The external stimulus may be applied to the adhesive so as to lower the adhesive force thereof, thus allowing for an easy removal of the pressure applications means.

For example, the adhesive may be provided in the peripheral area of the side or surface of the base from which the one or more projections protrude, e.g., the front side of the base, in an annular arrangement.

The at least one channel may have a width in the range of 5 to 800 µm, preferably 10 to 600 µm, more preferably 20 to 400 µm and even more preferably 50 to 200 µm.

The at least one channel may have a depth in the range of 5 to 200 µm, preferably 10 to 150 µm and more preferably 20 to 100 µm.

The at least one channel may have a length in the range of 0.5 to 100 mm, preferably 1 to 80 mm, more preferably 2 to 60 mm and even more preferably 5 to 50 mm.

The at least one channel may have a substantially straight or straight shape. The at least one channel may have a curved shape, such as a bent, wavy or undulating shape. The at least one channel may have a shape which is a combination of the shapes given above.

The at least one channel may extend over 5% or more, preferably 10% or more, more preferably 15% or more, even more preferably 20% or more, and yet even more preferably 30% or more of a width of the laminate. The length of the at least one channel may be 5% or more, preferably 10% or more, more preferably 15% or more, even more preferably 20% or more, and yet even more preferably 30% or more of the width of the laminate.

The at least one channel may extend over 5% or more, preferably 10% or more, more preferably 15% or more, even more preferably 20% or more, and yet even more preferably 30% or more of a length of the laminate. The length of the at least one channel may be 5% or more, preferably 10% or more, more preferably 15% or more, even more preferably 20% or more, and yet even more preferably 30% or more of the length of the laminate.

The laminate, comprising the base sheet, the intermediate layer and the cover film, has a thickness in the lamination direction, i.e., in the direction in which the base sheet, the intermediate layer and the cover film are laminated or stacked. The length and the width of the laminate are along directions perpendicular to the lamination direction.

The width and/or the depth of the at least one channel may be constant or vary along the length of the at least one channel.

The at least one channel extends in or along a plane of the laminate, i.e., a plane of the laminate perpendicular to the lamination direction. The at least one channel may extend to one or more side edges or lateral edges of the laminate. The lateral directions of the laminate are perpendicular to the lamination direction.

The at least one channel does not extend along the entire thickness of the laminate.

The method of the invention may be a method of manufacturing a microfluidic system or microfluidic device having a plurality of channels. The pressure may be applied to the front surface of the intermediate layer through the cover film so as to deform the intermediate layer, thereby forming the plurality of channels.

The microfluidic system or microfluidic device may have two or more channels, three or more channels, four or more channels, five or more channels, or six or more channels.

The microfluidic system or microfluidic device may have 50 or fewer channels, 40 or fewer channels, 30 or fewer channels, 20 or fewer channels, or 10 or fewer channels.

At least two of the plurality of channels may be connected to each other.

The channels may be identical to each other, e.g., in terms of their shapes and/or dimensions. At least some of the channels may be different from each other, e.g., in terms of their shapes and/or dimensions.

As has been detailed above, the pressure may be applied to the front surface of the intermediate layer through the cover film by using a pressure application means, such as a stamp, a mold or a die. The pressure application means may comprise the base, e.g., a base substrate, and the one or more projections protruding from the base, e.g., protruding from a plane surface of the base.

The base and the one or more projections may be made of the same material or of different materials.

In particular, the base and/or the one or more projections may be made of a rigid, hard material, such as a metal, a plastic, a ceramic or a semiconductor, e.g., Si.

For example, the one or more projections may be formed on a side or surface of a base substrate, e.g., a base substrate made of one of the above materials, by cutting the side or surface of the substrate, e.g., by cutting grooves and/or trenches into the side or surface. For example, this cutting process may be performed by mechanical cutting, e.g., using a blade or a saw, or by laser cutting.

The at least one channel may be formed by pressing the one or more projections into the intermediate layer via the cover film, i.e., with the cover film arranged therebetween, so as to deform the intermediate layer. This process may be performed during and/or after forming the laminate comprising the base sheet, the intermediate layer and the cover film.

If the intermediate layer is curable by an external stimulus, such as UV radiation, heat, an electric field and/or a chemical agent, the intermediate layer may be cured by applying this stimulus thereto while the one or more projections are pressed into the intermediate layer. In this way, the at least one channel can be formed with a particularly high degree of accuracy. After curing the intermediate layer, the pressure application means can be removed from the laminate.

The intermediate layer may be cured after the pressure application means has been removed from the laminate. This approach allows for a particularly easy removal of the pressure application means.

The cover film facilitates removal of the pressure application means from the laminate, e.g., before or after curing the intermediate layer. In particular, due to the presence of the cover film, the pressure application means can be removed from the laminate in a reliable and simple manner, avoiding any residues from the intermediate layer, such as resin, adhesive or gel residues, on the pressure application means.

The material of the base sheet is not particularly limited. Preferably, the base sheet is made of a rigid material, such as polyethylene terephthalate (PET) and/or silicon and/or glass and/or stainless steel.

For example, if the base sheet is made of PET or glass and the intermediate layer is curable by an external stimulus, the intermediate layer may be cured with radiation that is transmittable through PET or glass, for instance UV radiation. While glass may be a material that is generally difficult to process, no processing of the base sheet is required in the method of the invention. Further, the base sheet can be selected so as to have a small thickness, so that the material costs can be kept low. If the base sheet is made of silicon or stainless steel, a particularly cost-efficient base sheet is provided.

Also, the base sheet may be formed of a combination of the materials listed above.

The base sheet may have a thickness in the range of 200 to 1500 µm, preferably 400 to 1200 µm and more preferably 500 to 1000 µm.

The intermediate layer may be formed of a resin, an adhesive, a gel or the like. In particular, the intermediate layer may be formed of a curable resin, a curable adhesive, a curable gel or the like.

The intermediate layer may have a thickness in the range of 20 to 1000 µm, preferably 50 to 800 µm, more preferably 100 to 600 µm, even more preferably 150 to 500 µm, and yet even more preferably 200 to 400 µm.

The cover film may be made of a polymer material, such as polyvinyl chloride (PVC), polyolefin (PO) or ethylene vinyl acetate (EVA). For example, the cover film may be a "Saran" wrap-like material.

The cover film may have a thickness in the range of 5 to 200 µm, preferably 8 to 100 µm, more preferably 10 to 80 µm and even more preferably 12 to 50 µm. In this way, it can be particularly reliably ensured that the cover film is flexible and pliable enough to sufficiently conform to the contours of a pressure application means and, at the same time, exhibits a high degree of robustness.

The method may further comprise cutting the laminate comprising the base sheet, the intermediate layer and the cover film along the thickness direction of the laminate after forming the at least one channel, so as to obtain a plurality of microfluidic systems and/or microfluidic devices.

The invention further provides a microfluidic system or microfluidic device having at least one channel, wherein the microfluidic system or microfluidic device comprises a laminate comprising a base sheet, an intermediate layer and a cover film. A back surface of the intermediate layer is attached to a front surface of the base sheet and a back surface of the cover film is attached to a front surface of the intermediate layer opposite to the back surface thereof. The at least one channel is formed in the laminate so as to be open to the side of the cover film.

The features described above for the manufacturing method of the invention also apply to the microfluidic system or microfluidic device of the invention. In particular, the base sheet, the intermediate layer and the cover film of the microfluidic system or microfluidic device of the invention may be the base sheet, the intermediate layer and the cover film, respectively, described above for the manufacturing method of the invention.

The microfluidic system or microfluidic device of the invention is a microfluidic system or microfluidic device manufactured by the method of the invention.

Hence, the microfluidic system or microfluidic device of the invention provides the technical effects and advantages already described in detail above for the manufacturing method of the invention.

In the microfluidic system or microfluidic device of the invention, the thickness of the intermediate layer in the region or regions of the laminate where the at least one channel is formed is smaller than the thickness of the intermediate layer in the region or regions of the laminate where no channel is formed. The thickness of the intermediate layer in the region or regions of the laminate where the at least one channel is formed is smaller than the thickness of the intermediate layer in the region or regions of the laminate surrounding the at least one channel. The at least one channel arises from this thickness variation of the intermediate layer.

The microfluidic system or microfluidic device of the invention may be configured for processing and/or manipulating, e.g., transporting, mixing and/or separating, a fluid or fluids using the at least one channel. The microfluidic system or microfluidic device of the invention may be configured for processing and/or manipulating, e.g., transporting, mixing and/or separating, small amounts of a fluid or fluids, in particular, in the order of microliters, using the at least one channel.

The microfluidic system or microfluidic device of the invention may be used for receiving test materials and specimens to be treated and/or analysed. The microfluidic system or microfluidic device of the invention may be used for transporting test materials and specimens to be treated and/or analysed. The microfluidic system or microfluidic device of the invention may be used for treating and/or analysing test materials and specimens. The microfluidic system or microfluidic device of the invention may be used for some or all of the purposes given above.

The microfluidic system or microfluidic device of the invention may be employed in various technical fields, such as medical applications, biotechnology, chemical engineering, environment analysis, food quality analysis, measurement equipment, the analysis field, and flexible electronics manufacturing. The microfluidic system or microfluidic device of the invention may be used for a micro reactor and/or a micro analysis system. For example, the microfluidic system or microfluidic device of the invention may be a Micro Total Analysis System ($\mu$-TAS) and/or a Lab-on-a-chip (LOC).

BRIEF DESCRIPTION OF THE DRAWINGS

Hereinafter, non-limiting examples of the invention are explained with reference to the drawings, in which.

DETAILED DESCRIPTION OF PREFERRED EMBODIMENTS

Preferred embodiments of the present invention will now be described with reference to the accompanying drawings. The preferred embodiments relate to methods of manufacturing microfluidic systems or microfluidic devices and to microfluidic systems or microfluidic devices manufactured by these methods.

Figure 1:
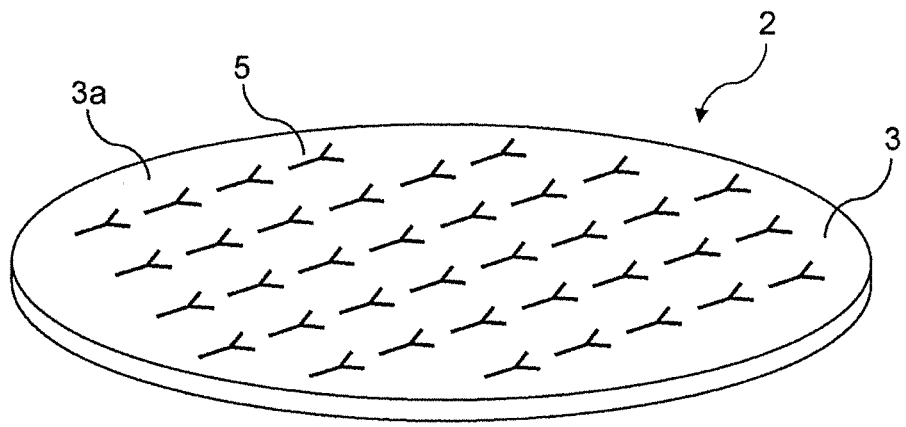
FIG. 1 is a perspective view showing a first embodiment of a pressure application means to be used for the manufacturing method of the present invention.

FIG. 1 is a perspective view showing a first embodiment of a pressure application means 2 which can be used for the manufacturing method of the present invention. The pressure application means 2 is in the form of a mold or a die.

The pressure application means 2 has a base 3, i.e., a base substrate, and a plurality of projections 5 protruding from the base 3, i.e., protruding from a plane surface of the base 3. The projections 5 are formed on a front side 3a of the base 3.

The base 3 has a circular shape in a top view thereon. All of the projections 5 are identical to each other in shape, substantially exhibiting a Y-shape in a top view on the pressure application means 2 (see FIG. 1). Further, all of the projections 5 have the same dimensions, i.e., the same length, width and height.

The base 3 and the projections 5 are made of the same material. The material of the base 3 and the projections 5 is a rigid, hard material, such as a metal, a plastic, a ceramic or a semiconductor, e.g., Si.

The projections 5 may be formed on the front side 3a of the base 3 by a cutting process, such as mechanical cutting, e.g., using a blade or a saw, or laser cutting, as has been detailed above.

Figure 2:
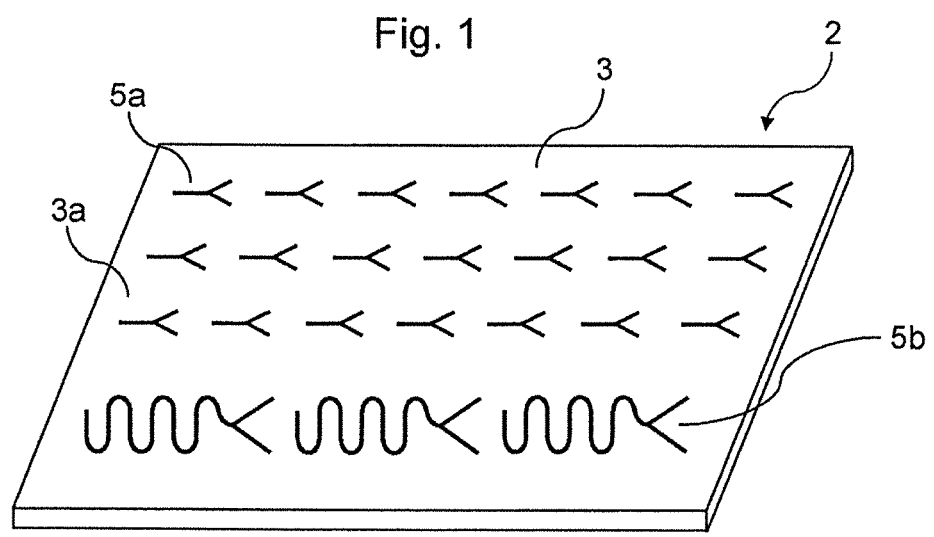
FIG. 2 is a perspective view showing a second embodiment of a pressure application means to be used for the manufacturing method of the present invention.

FIG. 2 is a perspective view showing a second embodiment of a pressure application means 2 which can be used for the manufacturing method of the present invention. Also the pressure application means 2 of the second embodiment is in the form of a mold or a die.

The pressure application means 2 according to the second embodiment differs from the pressure application means 2 according to the first embodiment in the shape of the base and the configuration of the projections. In the description of the second embodiment of the pressure application means 2, the elements which are substantially identical or similar to those of the first embodiment are denoted by the same reference signs and a repeated detailed description thereof is omitted.

As is shown in FIG. 2, the base 3 of the pressure application means 2 according to the second embodiment has a rectangular shape in a top view thereon. Two different types of projections 5a, 5b are formed on a front side 3a of the base 3. The first projections 5a are identical to each other in shape, substantially exhibiting a Y-shape in a top view on the pressure application means 2. The second projections 5b are identical to each other in shape, exhibiting an undulating shape with a branched end portion in a top view on the pressure application means 2 (see FIG. 2). Further, all of the first projections 5a have the same dimensions, and all of the second projections 5b have the same dimensions.

Due to the provision of the two different types of projections 5a, 5b on the front side 3a of the base 3, the pressure application means 2 shown in FIG. 2 can be used to manufacture a plurality of different microfluidic systems or devices, having different types of channels, in a single process, as will be further detailed below. Hence, this pressure application means 2 can be particularly advantageously used for the mass production of such systems and devices.

The shape of the base 3 is not particularly limited and can be, for example, a circular shape (see FIG. 1), an oval shape or a polygonal shape, such as a rectangular shape (see FIG. 2) or a square shape.

The shapes and dimensions of the projections 5, 5a, 5b are chosen dependent on the desired shapes and dimensions of the channel or channels to be formed. The shapes and dimensions of the channel or channels to be formed will be substantially identical to those of the projections 5, 5a, 5b, allowing for the channel or channels to be formed with a high degree of accuracy.

Figure 3:
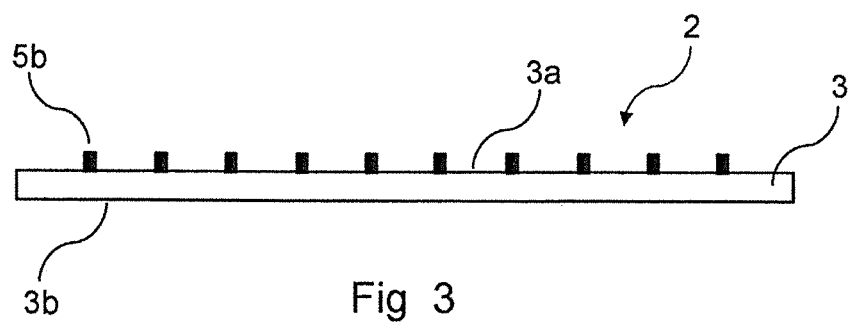
FIG. 3 is a schematic cross-sectional view of the pressure application means shown in FIG. 2.

FIG. 3 is a schematic cross-sectional view of the pressure application means 2 shown in FIG. 2. Specifically, FIG. 3 shows a cross-section along the long side of the rectangular base 3 and through the portion of the base 3 where the second projections 5b are arranged. It is to be noted that, for the sake of simplicity and better presentability, only ten portions of the projections 5b are shown in the cross-sectional view of FIG. 3. As is further shown in FIG. 3, the base 3 has a back side 3b opposite to its front side 3a.

In the following, a method of manufacturing a microfluidic system or microfluidic device according to an embodiment of the present invention, using the pressure application means 2 shown in FIG. 2, will be described with reference to FIGS. 4 to 13.

Figure 4:
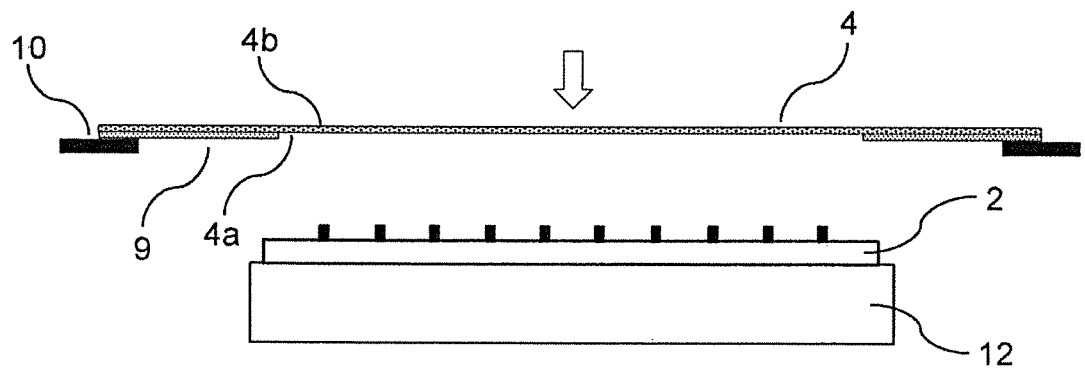
FIG. 4 is a cross-sectional view illustrating a step of attaching a cover film to the pressure application means shown in FIG. 2 in a manufacturing method according to an embodiment of the present invention.

First, a cover film 4 is provided (see FIG. 4). The cover film 4 has a front surface 4a and a back surface 4b. The cover film 4 may be made of a polymer material, such as polyvinyl chloride (PVC), polyolefin (PO) or ethylene vinyl acetate (EVA). For example, the cover film may be a "Saran" wrap-like material.

The cover film 4 may have a thickness in the range of 5 to 200 µm, preferably 8 to 100 µm, more preferably 10 to 80 µm and even more preferably 12 to 50 µm.

The cover film 4 is flexible and pliable, so that it can be particularly reliably ensured that the cover film 4 conforms to the contours of the projections 5a, 5b. Particularly preferably, the cover film 4 is expandable, e.g., expandable to twice its original size or more, three times its original size or more, or four times its original size or more.

An adhesive layer 9 is applied to the front surface 4a of the cover film 4. The adhesive layer 9 may have a thickness in the range of 5 to 200 µm, preferably 10 to 150 µm and even more preferably 20 to 100 µm.

The adhesive layer 9 is provided only in a peripheral area of the cover film 4, as is shown in FIG. 4. For example, the adhesive layer 9 may have an annular shape. The adhesive layer 9 serves to attach the cover film 4 to a frame 10, such as an annular frame. By attaching the cover film 4 to the frame 10 in this manner (see FIG. 4), handling of the cover film 4 in subsequent process steps is facilitated. However, the use of a frame, such as the frame 10, for handling the cover film 4 is purely optional. Further, the adhesive layer 9 serves to attach the cover film 4 to the front side 3a of the base 3, as will be detailed below with reference to FIG. 5.

The adhesive of the adhesive layer 9 may be curable by an external stimulus, such as heat, UV radiation, an electric field and/or a chemical agent. In this way, the pressure applications means 2 can be particularly easily removed after forming the plurality of channels. The external stimulus may be applied to the adhesive so as to lower the adhesive force thereof, thus allowing for an easy removal of the pressure applications means 2.

After attaching the cover film 4 to the frame 10 by means of the adhesive layer 9, the cover film 4 is attached to the front side 3a of the base 3 of the pressure application means 2 shown in FIG. 2, as is indicated by an arrow in FIG. 4. Before attaching the cover film 4 to the front side 3a of the base 3, the pressure application means 2 is placed on a chuck table 12, e.g., in a vacuum chamber, in a state in which the back side 3b of the base 3 is in contact with an upper surface of the chuck table 12 and the front side 3a of the base 3, from which the projections 5a, 5b protrude, is oriented upward (see FIG. 4).

As has been indicated above, the step of attaching the cover film 4 to the front side 3a of the base 3 may be carried out in a vacuum chamber. In particular, the cover film 4 may be attached to the front side 3a of the base 3 by using a vacuum laminator, e.g., in the manner detailed above. If the cover film 4 is expandable, it is expanded when being attached to the front side 3a of the base 3.

Figure 5:
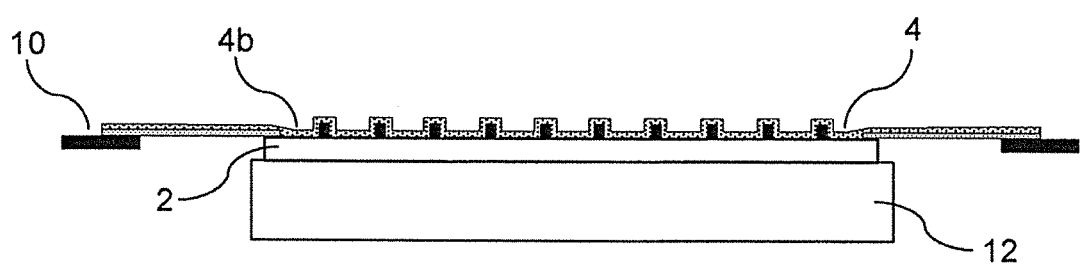
FIG. 5 is a cross-sectional view showing the outcome of the attachment step illustrated in FIG. 4.

The outcome of the attachment step illustrated in FIG. 4 is shown in FIG. 5. As is shown in this latter drawing, the cover film 4 is attached to the front side 3a of the base 3 so as to closely follow the contours of the projections 5a, 5b. Hence, at a subsequent stage of the manufacturing method of the present embodiment, channels can be formed with a particularly high degree of accuracy.

The cover film 4 is attached to the front side 3a of the base 3 by means of the adhesive layer 9. As is also shown in FIG. 5, the adhesive layer 9 is provided only in a peripheral area of the front side 3a. Thus, it can be particularly reliably ensured that no residues of the adhesive layer 9 remain in the region of the front side 3a where the projections 5a, 5b are formed after removal of the pressure applications means 2. Also, any adhesive residues in the channels to be formed by the pressure applications means 2 are avoided.

Further, by providing the adhesive layer 9 only in the peripheral area of the front side 3a, the area in which cover film 4 and pressure applications means 2 are attached to each other via the adhesive is significantly reduced. Thus, the pressure applications means 2 can be removed more easily after forming the channels.

In addition or as an alternative to attaching the cover film 4 to the front side 3a of the base 3 by means of the adhesive layer 9, the cover film 4 may be attached to the front side 3a by heating the cover film 4 during and/or after applying the cover film 4 to the front side 3a. Further, the cover film 4 can be softened by such a heating process, thus particularly reliably ensuring that the cover film 4 conforms to the topography of the front side 3a.

An attachment force between cover film 4 and base 3 may be generated through the heating process, as has been detailed above. The attachment of the cover film 4 to the base 3 may be caused in the heating process itself and/or in a subsequent process of allowing the cover film 4 to cool down. For example, the cover film 4 may be softened by the heating process. Upon cooling down, e.g., to its initial temperature, the cover film 4 may reharden, e.g., so as to create a form fit and/or a material bond to the base 3.

The cover film 4 may be heat resistant up to a temperature of 180° C. or more, preferably up to a temperature of 220° C. or more, and more preferably up to a temperature of 250° C. or more. In the heating process, the cover film 4 may be heated to a temperature in the range of 60° C. to 150° C., preferably 70° C. to 140° C., more preferably 80° C. to 130° C. and even more preferably 90° C. to 120° C. Particularly preferably, the cover film 4 is heated to a temperature of approximately 100° c.

In the heating process, the cover film 4 may be heated over a duration in the range of 30 sec to 10 min, preferably 1 min to 8 min, more preferably 1 min to 6 min, even more preferably 1 min to 4 min and yet more preferably 1 min to 3 min, during and/or after applying the cover film 4 to the front side 3a of the base 3.

The cover film 4 may be directly and/or indirectly heated, as has been detailed above. For example, the cover film 4 may be indirectly heated by heating the pressure application means 2 before and/or during and/or after applying the cover film 4 to the front side 3a of the base 3. The pressure application means 2 may be heated by heating the chuck table 12 (see FIG. 4).

Alternatively, the cover film 4 may be attached to the front side 3a of the base 3 in a different manner, other than heating the cover film 4 and/or using the adhesive layer 9. In particular, the cover film 4 may be attached to the front side 3a of the base 3 without the use of an adhesive.

Figure 6:
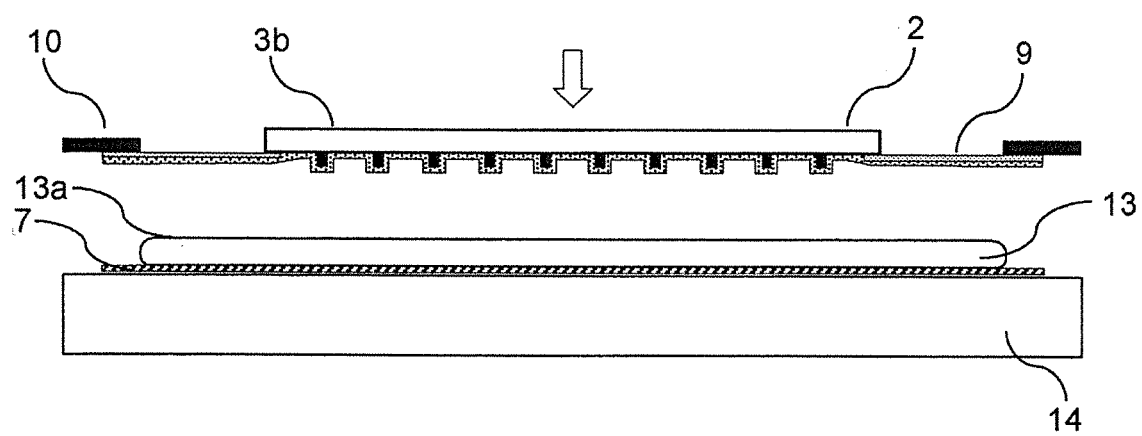
FIG. 6 is a cross-sectional view illustrating a step of pressing the pressure application means, having the cover film attached thereto, against an intermediate layer in the manufacturing method according to the embodiment of the present invention.

Further, a base sheet 7 and a deformable intermediate layer 13 are provided (see FIG. 6).

The material of the base sheet 7 is not particularly limited. Preferably, the base sheet 7 is made of a rigid material, such as polyethylene terephthalate (PET) and/or silicon and/or glass and/or stainless steel. The base sheet 7 may have a thickness in the range of 200 to 1500 µm, preferably 400 to 1200 µm and more preferably 500 to 1000 µm.

The intermediate layer 13 may be formed of a resin, an adhesive, a gel or the like. The intermediate layer 13 may have a thickness in the range of 20 to 1000 µm, preferably 50 to 800 µm, more preferably 100 to 600 µm, even more preferably 150 to 500 µm, and yet even more preferably 200 to 400 µm.

The intermediate layer 13 is curable by an external stimulus, such as UV radiation, heat, an electric field and/or a chemical agent. Thus, the intermediate layer 13 hardens, at least to some degree, upon application of the external stimulus thereto. The intermediate layer 13 may be configured so as to reach a rigid, hard state after curing. Preferred examples of UV curable resins for use as the intermediate layer 13 are ResiFlat by the DISCO Corporation and TEMPLOC by DENKA.

The base sheet 7 and the intermediate layer 13 are laminated so that a back surface of the intermediate layer 13 is attached to a front surface of the base sheet 7. A back surface 7b of the base sheet 7 opposite to its front surface (see FIG. 8) is arranged on an upper surface of a support 14, such as a chuck table (see FIG. 6). A front surface 13a of the intermediate layer 13 opposite to its back surface is arranged so as to face upwards.

Subsequently, the pressure application means 2, having the cover film 4 attached thereto, is pressed against the front surface 13a of the intermediate layer 13, as is illustrated by an arrow in FIG. 6. In this way, pressure is applied to the front surface 13a of the intermediate layer 13 through the cover film 4 so as to deform the intermediate layer 13, thereby forming a plurality of channels 20 (see FIG. 9). Specifically, the projections 5a, 5b are pressed into the intermediate layer 13, with the cover film 4 arranged therebetween, so as to deform the intermediate layer 13.

Further, by pressing the pressure application means 2, having the cover film 4 attached thereto, against the front surface 13a of the intermediate layer 13, the back surface 4b of the cover film 4 is attached to the front surface 13a of the intermediate layer 13, thereby forming a laminate comprising the base sheet 7, the intermediate layer 13 and the cover film 4. Hence, in the method of the present embodiment, the channels 20 are formed during, i.e., at the same time as, forming the laminate comprising the base sheet 7, the intermediate layer 13 and the cover film 4.

Figure 7:
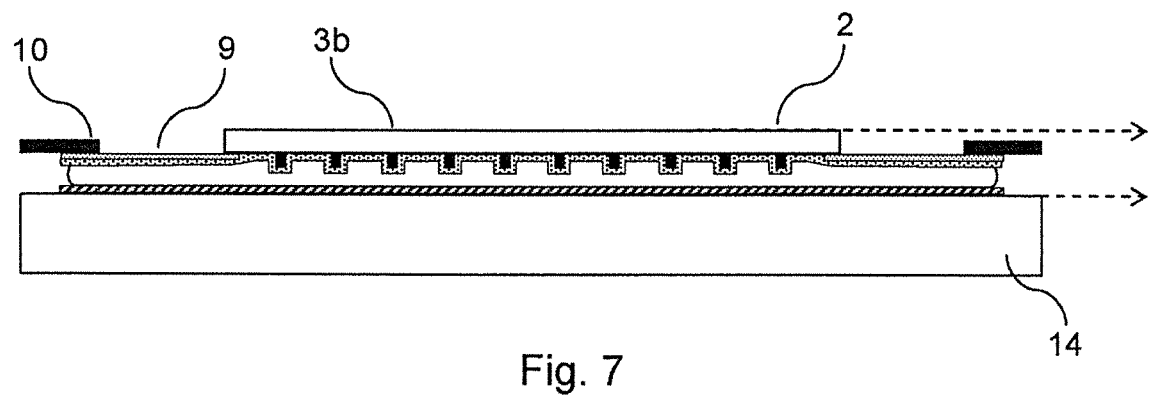
FIG. 7 is a cross-sectional view showing the outcome of the pressure application step illustrated in FIG. 6.

FIG. 7 is a cross-sectional view showing the outcome of the pressure application step illustrated in FIG. 6. The back surface 7b of the base sheet 7 is parallel to the back side 3b of the base 3 of the pressure application means 2, as is indicated by dashed arrows in FIG. 7. Thus, the channels 20 are formed in a particularly precise and homogeneous manner.

Figure 8:
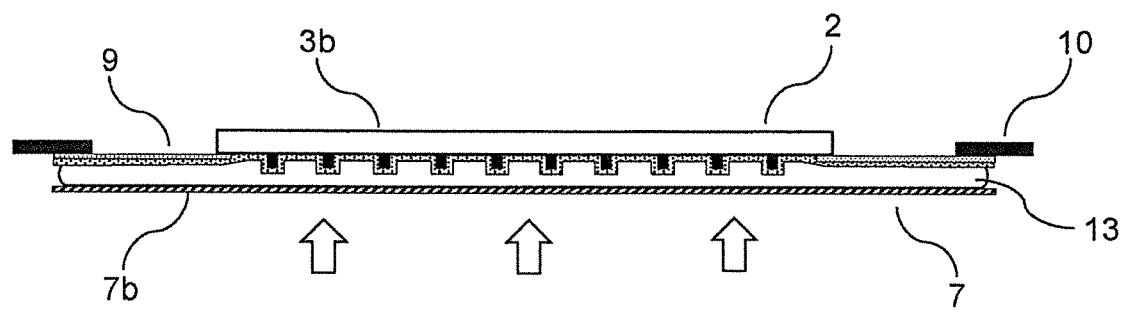
FIG. 8 is a cross-sectional view illustrating a step of curing the intermediate layer in the manufacturing method according to the embodiment of the present invention.

Subsequently, the external stimulus, such as UV radiation, heat, an electric field and/or a chemical agent, is applied to the intermediate layer 13, as is indicated by arrows in FIG. 8, so as to cure the intermediate layer 13.

Specifically, the intermediate layer 13 is cured by applying the external stimulus thereto while the projections 5a, 5b are pressed into the intermediate layer 13. By curing the intermediate layer 13, the attachment between cover film 4 and intermediate layer 13 may be further enhanced.

If the base sheet 7 is made of PET or glass and the intermediate layer 13 is curable by radiation, the intermediate layer 13 may be cured with radiation that is transmittable through PET or glass, for instance UV radiation. In this case, the radiation may be applied from the side of the back surface 7b of the base sheet 7 (see FIG. 8). For example, ResiFlat by the DISCO Corporation and TEMPLOC by DENKA may be used as UV curable resins for the intermediate layer 13.

Figure 9:
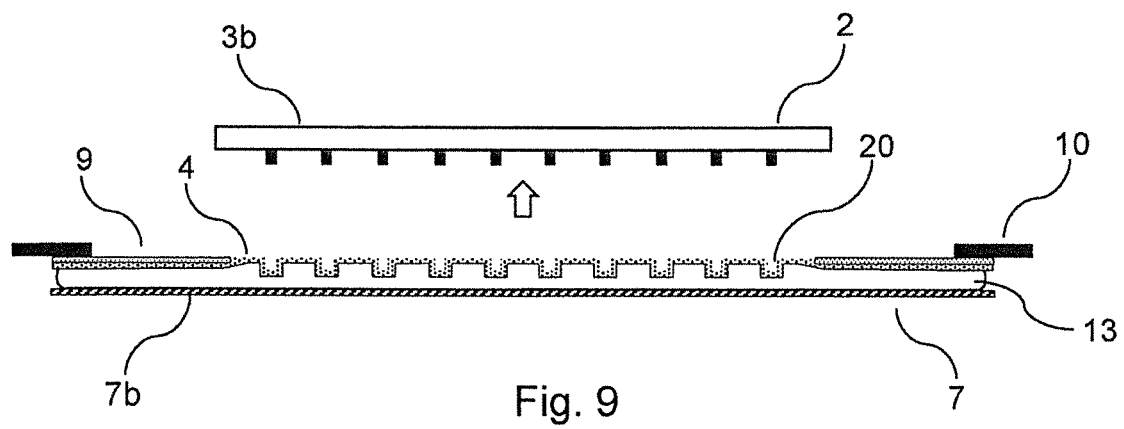
FIG. 9 is a cross-sectional view illustrating a step of removing the pressure application means from a laminate, comprising a base sheet, the intermediate layer and the cover film, in the manufacturing method according to the embodiment of the present invention.

After curing the intermediate layer 13, the pressure application means 2 is removed from the laminate, as is indicated by an arrow in FIG. 9.

If the adhesive of the adhesive layer 9 is curable by an external stimulus, such as heat, UV radiation, an electric field and/or a chemical agent, this stimulus may be applied to the adhesive so as to lower the adhesive force thereof, thus allowing for a particularly easy removal of the pressure applications means 2 from the laminate.

As is further shown in FIG. 9, the laminate comprises a plurality of channels 20 formed therein by the pressure applications means 2. The channels 20 are formed in the laminate so as to be open to the side of the cover film 4.

Figure 10:
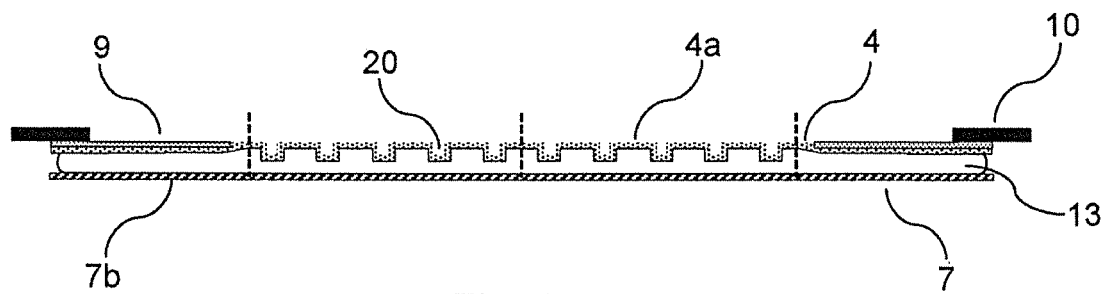
FIG. 10 is a cross-sectional view illustrating a step of cutting the laminate in the manufacturing method according to the embodiment of the present invention.

After removing the pressure applications means 2 from the laminate, the laminate is cut along its thickness direction, as is indicated by dashed vertical lines in FIG. 10. In this way, a plurality of microfluidic systems and/or microfluidic devices 30 (see FIG. 11) are obtained.

Further, by this cutting process, the microfluidic systems and/or microfluidic devices 30 are separated from the adhesive layer 9 and the frame 10.

Figure 11:
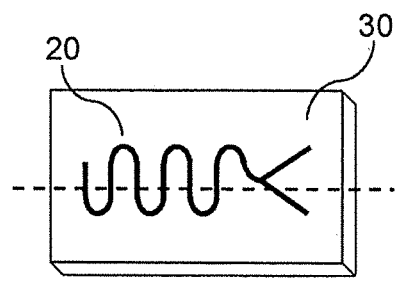
FIG. 11 is a top view showing a microfluidic system or device obtained by the cutting step illustrated in FIG. 10.

FIG. 11 is a top view showing a microfluidic system or device 30 obtained by the cutting step illustrated in FIG. 10. The microfluidic system or device 30 is a microfluidic system or device according to an embodiment of the present invention.

The microfluidic system or device 30 has a channel 20, the shape and dimensions of which are substantially identical to those of the second projections 5b. Specifically, the channel 20 has an undulating shape with a branched end portion in a top view on the microfluidic system or device 30. Hence, the channel 20 effectively consists of two channels which are connected to each other, the first channel consisting of the undulating portion of the channel 20 and one straight branch of the branched end portion and the second channel consisting of the other straight branch of the branched end portion. The branched end portion of the channel 20 may be used, e.g., for separating and/or mixing a fluid or fluids, in particular, small amounts of a fluid or fluids, e.g., on the order of microliters.

The channel 20 is configured to receive and transport test materials and specimens to be treated and/or analysed. The channel 20 is a microfluidic channel.

The channel 20 may have a width in the range of 5 to 800 μm, preferably 10 to 600 μm, more preferably 20 to 400 μm and even more preferably 50 to 200 μm. The channel 20 may have a depth in the range of 5 to 200 μm, preferably 10 to 150 μm and more preferably 20 to 100 μm. The channel 20 may have a length in the range of 0.5 to 100 mm, preferably 1 to 80 mm, more preferably 2 to 60 mm and even more preferably 5 to 50 mm.

Figure 12:
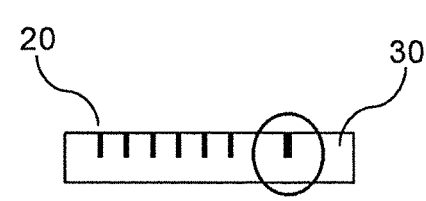
FIG. 12 is a cross-sectional view of the microfluidic system or device shown in FIG. 11.
Figure 13:
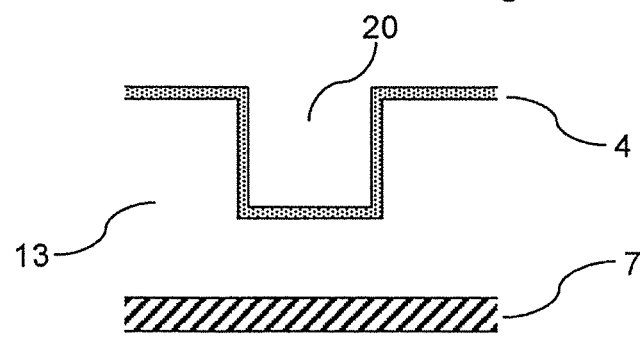
FIG. 13 is an enlarged view of the encircled area in FIG. 12.

FIG. 12 is a cross-sectional view of the microfluidic system or device 30 taken along the dashed line in FIG. 11. FIG. 13 is an enlarged view of the encircled area in FIG. 12. As is shown in FIG. 13, the channel 20 does not extend along the entire thickness of the intermediate layer 13.

Figure 14:
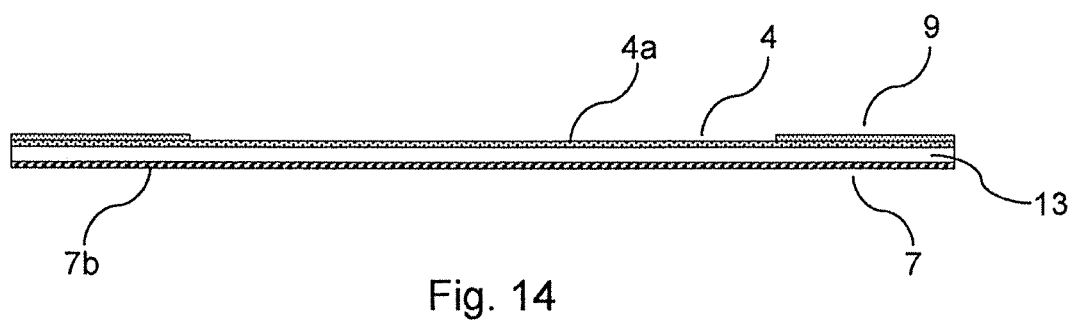
FIG. 14 is a cross-sectional view of a laminate, comprising a base sheet, an intermediate layer and a cover film, for use in a manufacturing method according to another embodiment of the present invention.

According to another embodiment of the manufacturing method of the present invention, the base sheet 7, the intermediate layer 13 and the cover film 4 may be laminated first, thereby forming the laminate comprising the base sheet 7, the intermediate layer 13 and the cover film 4. Such a laminate is shown in FIG. 14. Optionally, an adhesive layer 9 may be applied to the front surface 4a of the cover film 4 substantially in the same manner as detailed above. The adhesive layer 9 may serve to attach the cover film 4 to a frame, such as the frame 10, in order to facilitate handling of the laminate in subsequent process steps. However, the adhesive layer 9 may also be omitted.

Subsequently, after forming the laminate, pressure may be applied to the front surface 13a of the intermediate layer 13 through the cover film 4 so as to deform the intermediate layer 13, thereby forming the channels 20 in the laminate.

The process of applying pressure to the front surface 13a of the intermediate layer 13 may be performed substantially in the same manner as detailed above, i.e., by using the pressure application means 2. The approach of the present embodiment mainly differs from that described above with reference to FIGS. 4 to 13 in that the cover film 4 is attached to the intermediate layer 13 rather than the pressure application means 2 when the pressure application means 2 is pressed against the intermediate layer 13.

If the cover film 4 is expandable, it is expanded when the pressure is applied to the front surface 13a of the intermediate layer 13 through the cover film 4.

Subsequent steps of curing the intermediate layer 13, removing the pressure application means 2 from the laminate and cutting the laminate may be performed in the same manner as described above with reference to FIGS. 8 to 10.

The invention claimed is:

1. A method of manufacturing a microfluidic device having at least one channel, wherein the method comprises:
providing a base sheet;
providing a deformable intermediate layer;
providing a cover film;
laminating the base sheet, the intermediate layer and the cover film so that a back surface of the intermediate layer is attached to a front surface of the base sheet and a back surface of the cover film is attached to a front surface of the intermediate layer opposite to the back surface of the intermediate layer, thereby forming a laminate comprising the base sheet, the intermediate layer and the cover film; and
applying pressure to the front surface of the intermediate layer by a pressure application means, the pressure applied by the pressure application means pressing the intermediate layer through the cover film so as to deform the intermediate layer, thereby forming the at least one channel,
the method further including removing the pressure application means from the entire laminate, including the base sheet, the intermediate layer and the cover film,
wherein a thickness of the intermediate layer where the at least one channel is formed is smaller than a thickness of the intermediate layer where the channel is not formed, and
the intermediate layer is curable by an external stimulus.

2. The method according to claim 1, wherein the cover film is expandable and the method further comprises expanding the cover film.

3. The method according to claim 2, wherein the cover film is expanded when the pressure is applied to the front surface of the intermediate layer through the cover film.

4. The method according to claim 1, further comprising applying the external stimulus to the intermediate layer so as to cure the intermediate layer, after forming the at least one channel.

5. The method according to claim 1, wherein the base sheet, the intermediate layer and the cover film are laminated first, thereby forming the laminate comprising the base sheet, the intermediate layer and the cover film, and subsequently pressure is applied to the front surface of the intermediate layer through the cover film so as to deform the intermediate layer, thereby forming the at least one channel.

6. The method according to claim 1, wherein the at least one channel has a width in the range of 5 to 800 μm and/or a depth in the range of 5 to 200 μm and/or a length in the range of 0.5 to 100 mm.

7. The method according to claim 1, wherein the microfluidic device has a plurality of channels, and the pressure is applied to the front surface of the intermediate layer through the cover film so as to deform the intermediate layer, thereby forming the plurality of channels.

8. The method according to claim 7, wherein at least two of the plurality of channels are connected to each other.

9. The method according to claim 1, wherein the pressure is applied to the front surface of the intermediate layer through the cover film by a stamp, a mold or a die.

10. The method according to claim 1, wherein the base sheet is made of a rigid material.

11. The method according to claim 1, wherein the base sheet has a thickness in the range of 200 to 1500 μm.

12. The method according to claim 1, wherein the intermediate layer is formed of a resin, an adhesive or a gel.

13. The method according to claim 1, wherein the intermediate layer has a thickness in the range of 20 to 1000 μm.

14. The method according to claim 1, wherein the cover film is made of a polymer material.

15. The method according to claim 1, wherein the cover film has a thickness in the range of 5 to 200 μm.

16. A microfluidic device having at least one channel, wherein the microfluidic device comprises:

a laminate comprising a base sheet, an intermediate layer and a cover film; wherein a back surface of the intermediate layer is attached to a front surface of the base sheet and a back surface of the cover film is attached to a front surface of the intermediate layer opposite to the back surface of the intermediate layer, and the at least one channel is formed in the intermediate layer of the laminate so that the entire at least one channel is exposed along a front surface of the cover film opposite to the back surface of the cover film, a thickness of the intermediate layer where the at least one channel is formed is smaller than a thickness of the intermediate layer where the channel is not formed, and the intermediate layer is curable or cured by an external stimulus.

\* \* \* \* \*